(12) United States Patent
Kim et al.

(10) Patent No.: US 6,180,276 B1
(45) Date of Patent: *Jan. 30, 2001

(54) METHOD FOR FABRICATING MEMBRANE AND ELECTRODE ASSEMBLY FOR POLYMER ELECTROLYTE MEMBRANE FUEL CELLS

(75) Inventors: Chang-Soo Kim; Young-Gap Chun, both of Taejon; Dong-Hyun Peck, Kumpo-shi; Dong Ryul Shin, Taejon, all of (KR)

(73) Assignee: Korea Institute of Energy Research, Taejon (KR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/149,088

(22) Filed: Sep. 8, 1998

(30) Foreign Application Priority Data

Feb. 23, 1998 (KR) .................................................. 98-5531

(51) Int. Cl.[7] .............................. H01M 8/10; H01M 4/62; H01M 4/88
(52) U.S. Cl. ................................ 429/41; 429/33; 429/42; 427/125; 427/244; 427/429; 502/101; 502/4
(58) Field of Search .................................. 429/30–33, 41, 429/42, 43; 502/4, 101; 427/429, 421, 282

(56) References Cited

U.S. PATENT DOCUMENTS

| 5,415,888 | * | 5/1995 | Banerjee et al. ..................... 427/125 |
| 5,547,911 | * | 8/1996 | Grot .................................... 427/125 |

* cited by examiner

Primary Examiner—Stephen Kalafut
Assistant Examiner—Mark Ruthkosky
(74) Attorney, Agent, or Firm—Bacon & Thomas

(57) ABSTRACT

A method for fabricating an electrode and membrane assembly (MEA) for polymer electrolyte membrane fuel cells. The MEA comprises a polymer electrolyte membrane on each side of which an electrocatalyst layer is provided in a melted state. A perfluorosulfonyl fluoride copolymer powder ranging, in particle size distribution, from 20 to 200 $\mu$m is hot-pressed at 200–250° C. to give a pre-formed sheet whose opposite sides are then coated with a catalyst ink consisting of Pt/C powder, glycerol and water. This catalyst ink-coated preformed sheet is again subjected to hot pressing at 200–250° C. to embed the catalyst ink into the pre-formed sheet. Hydrolysis in NaOH/methanol or $H_2SO_4$ solution converts the membrane of the sheet from a non-ionized form to an ionized form.

7 Claims, 4 Drawing Sheets

METHOD FOR FABRICATING MEMBRANE AND ELECTRODE ASSEMBLY FOR POLYMER ELECTROLYTE MEMBRANE FUEL CELLS

BACKGROUND OF THE INVENTION

1. Field of the Invention

The present invention relates, in general, to a method for fabricating a membrane and electrode assembly (hereinafter referred to as MEA ) and, more particularly, to use of a perfluorosulfonyl fluoride copolymer sheet as an electrolyte support which is so melt-processable that electrocatalysts are partially embedded thereinto upon hot pressing, thus providing effective three-phase boundaries in the interfaces between membrane and electrodes for polymer electrolyte membrane fuel cell(PEMFC).

2. Description of the Prior Art

Fuel cells are of clean technology, which convert chemical energy directly into electric energy, with electric power being produced as a part of a chemical reaction between the electrolyte and a fuel such as kerosine or industrial fuel gas, in which the hydrogen of carbohydrates such as methanol and natural gas and the oxygen of the air are usually used as a fuel and an oxidizer, respectively. In the 1970s, a fuel cell was developed as an electric power source for spacecrafts in the U.S. and since then, many studies have been made on application of fuel cells for general uses and great advances were achieved, particularly, in the U.S. and Japan.

Depending on the kinds of the electrolytes used, fuel cells are divided largely into alkali type(AFC), phosphate type (PAFC), melt carbonate type(MCFC), solid oxide type (SOFC) and polymer electrolyte type(PEMFC). Of them, the PEMFC are now much more actively developed as an electric power source, such as a power source for automobiles, a transportable electric source, an on-site power source, than those of other types in advanced countries including the U.S., Japan and Europe because of their superiority in many aspects. For instance, since the PEMFC utilize solid polymers as electrolytes, there occurs no erosion and evaporation of the electrolytes in the fuel cells. Further, the PEMFC can produce high current density per area, showing far superiority in output to other types as well as can be operated at low temperatures.

A PEMFC consists of a plurality of single cells, each comprising a proton-exchange membrane as an electrolyte to either side of which a positive and a negative electrode are respectively adhered by hot pressing and thus, a stack of the single cells can give an electricity-generating system ranging, in power, from kilowatts up to megawatts.

Such a single cell produces electricity according to the following mechanism. On the surface of a fuel electrode, the hydrogen atoms in the fuel react to donate electrons, becoming protons. The electrons flow to an oxygen electrode via an external circuit, producing electricity, whereas the protons move through the polymer electrolyte membrane(PEM) toward the oxygen electrode. At the oxygen electrode, the electrons reached reduce the oxygen molecules which, then, react with the protons to give water.

The performance of the PEMFC is dependent greatly on the electrodes. Each of the electrodes consists of an electrode support and an electrocatalyst layer. Usually, the electrode support is formed of a carbon cloth and the electrocatalyst layer is made porous by binding platinum-coated carbon powders with a water-proof binder (Pt/C).

A smaller contact area between electrodes and a catalyst is available for the PEMFC using solid electrolytes than for other fuel cells using liquid electrolytes. A typical PEMFC is, therefore, relatively low (>10–20%) in catalyst utilization of Pt catalyst, showing a problem of requiring a high load of catalyst (4 mg/cm$^2$).

As for the electrode reaction in a PEMFC, it occurs at a three-phase (electrolyte-catalyst-fuel gas phase) boundary, so that its rate changes greatly with the property of the boundary. For instance, the electrode reaction rate can be accelerated by bringing the electrodes into good contact with the electrolyte under a condition of uniformly diffusing the fuel gas in the electrodes. Accordingly, active research and development efforts have been and continue to be directed to the enhancement of the three-phase boundary, with the aim of increasing catalyst utilization and decreasing catalyst load.

There are known several conventional techniques for preparing effective three-phase boundaries. For example, ionomer-brushed or ionomer-impregnated electrodes, which are respectively obtained by coating a Nafion solution on the surface of a catalyst layer with the aid of a brush and drying it in an inert atmosphere or by forming a catalyst layer with a slurry combined with a Nafion solution, are adhered to both sides of a membrane by hot pressing to give an MEA, as disclosed by E. A. Ticianelli, C. R. Derouin, A. Redondo and S. Sirinivasan in *J. Of Electrochemical. Soc.*, Vol. 135 No. 9, pp. 2209–2214, 1988 and by Aoyama, N. Eda and A. Ohta in *J. Electrochem. Soc.*, Vol. 142 No. 2, pp. 463–468, 1995. The Nafion solution, which is prepared by mixing a proper amount of Nafion powder in a combination of water and alcohol, makes the contact between the electrode catalyst layer and the polymer electrolyte membrane(PEM) improved, giving rise to an increase in the utilization of the catalyst, platinum.

In the case of using such a Nafion solution to enhance the three-phase boundary, the electrodes are adhered to the polymer membrane by hot pressing, not in a fused state, but in a simple physically close contact state. Thus, the polymer membrane is simply brought into simple contact with the electrodes in plane, which has a limit in improving the utilization of the platinum catalyst. Additionally, a Nafion solution itself is expensive, increasing the cost of the electrodes.

Another technique for preparing effective three-phase boundaries is reported by E. J. Taylor, E. B. Anderson and N. R. K. Vilambi, in *J. Electrochem. Soc.*, Vol. 139, No. 5, pp. L45–L46, 1992, which discloses that a Pt catalyst is electrodeposited locally in a contact site between an electrode and a polymer electrolyte by an electrochemical method using a platinum cation-containing electrolyte, such as Pt (NH$_3$)$_4$Cl$_2$.

This electrochemical Pt catalyst-localization method is somewhat irksome in carrying out the electrodeposition and found to have a high possibility of delaminating an electrolyte membrane from an electrode layer.

SUMMARY OF THE INVENTION

Therefore, it is an object of the present invention to overcome the above problems encountered in prior arts and to provide a simple method for fabricating an MEA for fuel cells, with which the cost of the electrodes for fuel cells can be significantly reduced.

It is another object of the present invention to provide a method for fabricating an MEA for PEMFC, by which the MEA is superior in the bonding strength between electrode and membrane and in the effective electrode reaction on the three-phase boundary.

BRIEF DESCRIPTION OF THE DRAWINGS

The above and other objects and aspects of the invention will become apparent from the following description of embodiments with reference to the accompanying drawings in which.

DETAILED DESCRIPTION OF THE INVENTION

Figure 1:
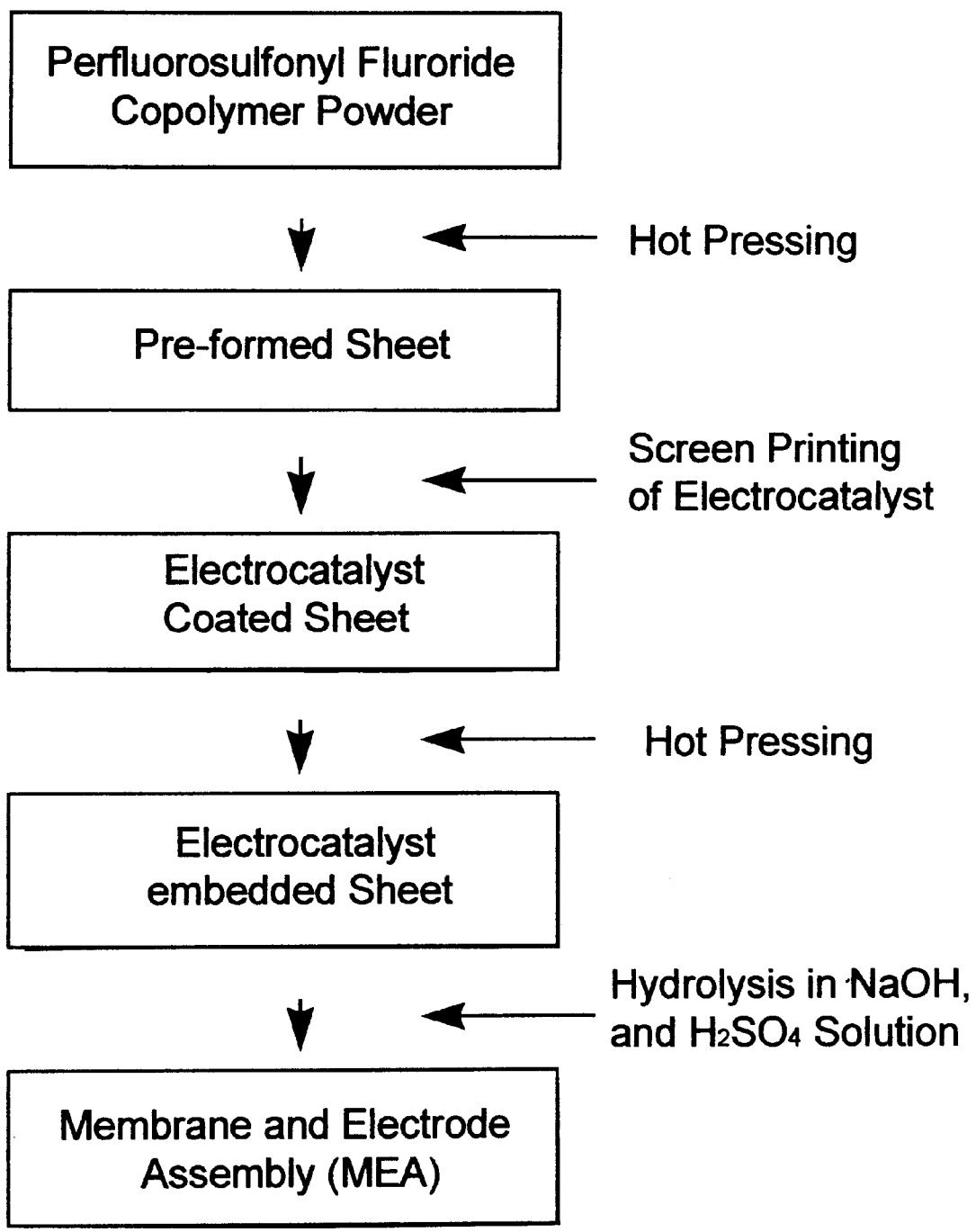
FIG. 1 is a process flow illustrating a fabricating method of an MEA, in accordance with the present invention.

Referring to FIG. 1, a method for fabricating an MEA for PEMFC is stepwise illustrated, in accordance with the present invention.

First, a perfluorosulfonyl fluoride copolymer powder is prepared for use in forming a polymer electrolyte membrane. The perfluorosulfonyl fluoride copolymer, which is a precursor for perfluorosulfonate membranes, is melt-processable and can be processed simply into various forms, such as sheets or tubes. However, perfluorosulfonate ionomer membranes are not melt-processable owing to side chain entanglement and ionic interactions between the functional groups.

Figure 2:
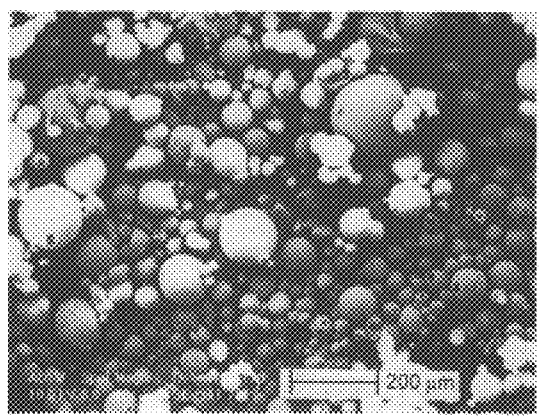
FIG. 2 is a scanning electron microscope (SEM) photograph of a perfluorosulfonyl fluoride copolymer powder for use in pre-forming a sheet.

With reference to FIG. 2, there is an SEM photograph showing the morphology of the perfluorosulfonyl fluoride copolymer powder, which is spherical with some cavities and ranges, in particle size distribution, from about 20 to 200 $\mu$m.

Turning now to FIG. 1, the perfluorosulfonyl fluoride copolymer is put in a frame and pre-formed as a sheet by hot pressing at a suitable temperature.

Figure 3:
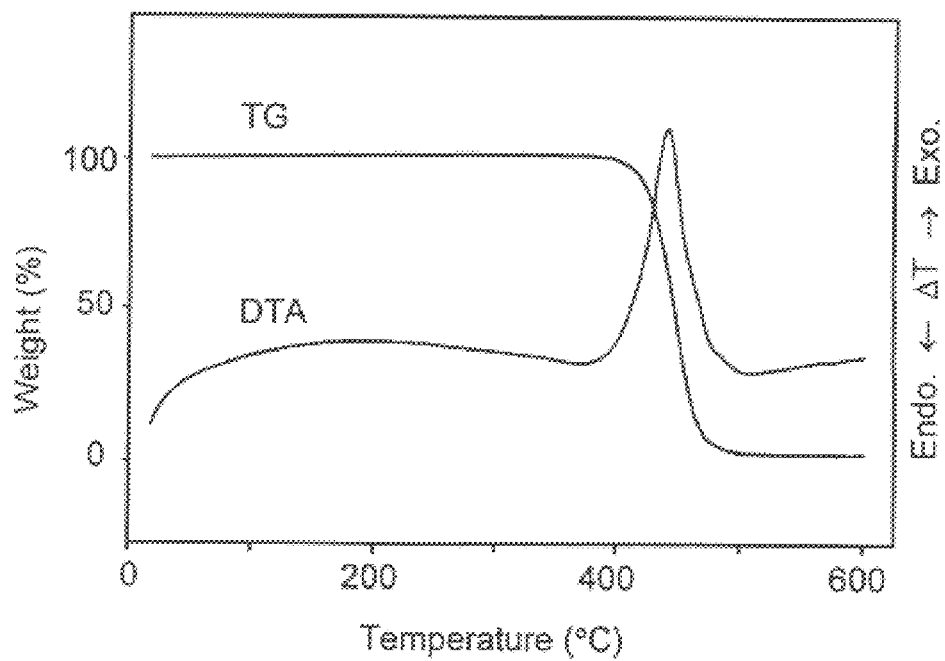
FIG. 3 shows DTA-TG vs. temperature curves for the perfluorosulfonyl fluoride copolymer powder.

With reference to FIG. 3, there are a differential thermal analysis (DTA) and a thermogravimetric analysis (TG) curve for establishing a proper condition under which the perfluorosulfonyl fluoride copolymer powder is processed. For these curves, temperature was elevated at a speed of 10° C./min up to 700° C. As apparent from FIG. 3, the exothermic reaction and the weight loss start at about 380° C. and finish at about 500° C. Particularly, the weight loss curve shows that the precursor powder decomposes completely by about 500° C. Accordingly, the precursor powder should be pre-formed at a temperature not more than 380° C.

Many sheets were formed from the precursor powders at various temperatures from 200° C. to 380° C. at which the powders start to melt and to decompose, respectively. The sheets obtained at above 250° C. were observed to have pores therein. Although improving the gas permeability of the sheet, the pores act as blocking barriers in proton conduction. Therefore, it is preferable that the perfluorosulfonyl fluoride copolymer powder is pre-formed into a sheet at a temperature of 200–250° C.

The amount of the powder to be pressure-molded in the frame must be controlled; otherwise, the molten precursor overflows the frame, which makes it difficult to form a sheet uniform in thickness.

According to the process flow of FIG. 1, the pre-formed sheet is applied with an electrocatalyst by screen printing. For this, a catalyst ink is first prepared by mixing together carbon-supported Pt (Pt/C), glycerol and water at a suitable weight ratio. It is preferable that the weight ratio of Pt/C:glycerol:water ranges 1:3:5 to 1:10:5. Since the viscosity of the ink and the dispersion degree of the carbon-supported Pt have a great influence on the adhesion to the sheet, it is very important to determine the amount of glycerol and water. The Pt/C catalyst ink is coated on one side of the sheet held in place on a vacuum table by a screen printing method, followed by drying the coated sheet for 1 hour on the vacuum table at 100° C. Then, the same process is repeated on the other side of the sheet, to provide an electrocatalyst layer on each side of the pre-formed precursor sheet.

Subsequently, the electrocatalyst-coated sheet is replaced in the same frame and subjected to hot pressing. The hot pressing is preferably carried out at a temperature of about 200–250° C. for 3 min under a pressure of 100 kg/cm. Since at a temperature of 200–250° C. the surface of the pre-formed precursor sheet is slightly melted, the electrocatalyst layer is embedded into the sheet.

Because the electrocatalyst-embedded membrane thus obtained is a non-ionized form, it must be converted into acid type ion-exchange membrane. This can be achieved by hydrolysis. For example, immersion in NaOH or $H_2SO_4$ solution ionizes the non-ionized form of the membrane into an $Na^+$ or $H^+$ type perfluorosulfonate membrane. Where an NaOH solution is used, an addition of methanol in the NaOH solution results in promoting the wetting and swelling properties of the membrane.

As illustrated, the MEA obtained according to the present invention comprises a perfluorosulfonate membrane which provides an effective three-phase boundary without delamination because an electrocatalyst is embedded into a pre-formed sheet upon hot pressing, leading to a potential bonding therebetween.

A better understanding of the present invention may be obtained in light of the following examples which are set forth to illustrate, but are not to be construed to limit the present invention.

EXAMPLE I: MEA FABRICATION

A perfluorosulfonyl fluoride copolymer powder, melt-processable with a particle size distribution of 20–200 $\mu$m, was prepared, filled in a stainless steel frame (50 mm +50 mm, t=180 $\mu$m), and hot-pressed at a temperature of 200–250° C. to give a pre-formed precursor sheet.

Separately, a catalyst ink was prepared by mixing together carbon-supported Pt (Pt/C), glycerol and water at a weight ratio of Pt/C:glycerol:water ranges 1:3:5 to 1:10:5. On one side of the sheet held in place on a vacuum table, the catalyst ink was coated by a screen printing method, followed by drying the coated sheet for 1 hour on the vacuum table at 100° C. Then, the same process was repeated on the other side of the sheet, to provide an electrocatalyst layer on each side of the pre-formed precursor sheet.

Subsequently, the electrocatalyst-coated sheet was subjected to hot pressing at 200–250° C. for 3 min under a pressure of 100 kg/min in the same stainless steel frame, so as to make the electrocatalyst layers embed into the sheet.

The electrocatalyst-embedded membrane thus obtained was boiled in a mixture of 20% NaOH and methanol (volume ratio of 1:1 to 2:1) at 90° C. for 7 hour and then, washed several times with deionized water. As a result of the hydrolysis, the perfluorosulfonyl fluoride membrane was transformed into a $Na^+$ form, that is, a perfluorosulfonate membrane. The electrocatalyst-embedded membrane in the $Na^+$ form was further converted to an H+ form by immersing it 0.5 M $H_2SO_4$ for 60 min and rinsing several times with deionized water.

Figure 4:
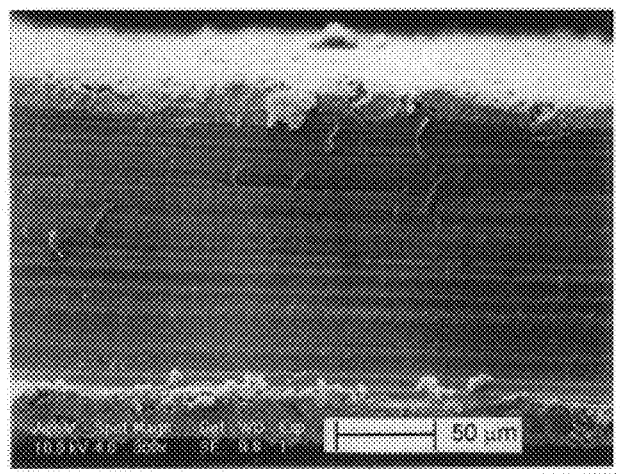
FIG. 4 is an SEM photograph showing a cross section of the MEA, in accordance with the present invention.
Figure 5:
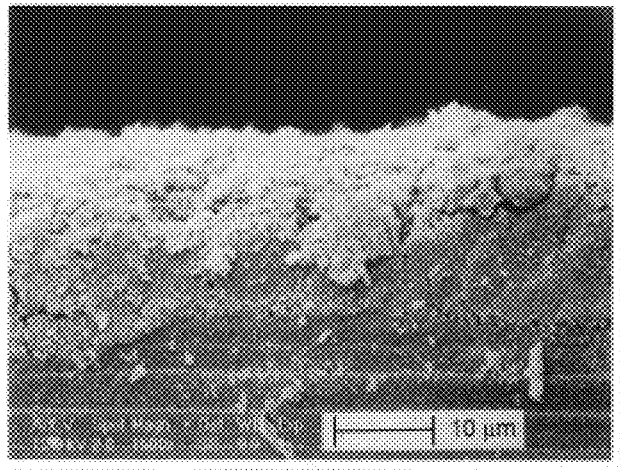
FIG. 5 is a magnified SEM photograph, taken from FIG. 4, showing an interface between the electrocatalyst layer and the electrode.
Figure 6:
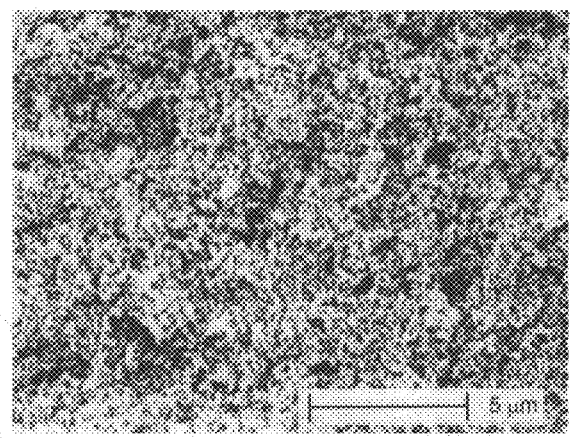
FIG. 6 is an SEM photograph showing the surface of the electrocatalyst layer.

The MEA fabricated was analyzed via SEM photographs and the results are given in FIGS. 4 to 6.

The interface soundness of the electrocatalyst-embedded membrane was investigated by SEM. FIG. 4 shows a cross section of the MEA and FIG. 5 is a magnified photograph showing the interface between the membrane and the electrode. In FIG. 4, the membrane appears as the central part with a maximum thickness of 140 μm while the electrodes as the upper and bottom layers with a maximum thickness of 20 μm. As shown in FIGS. 4 and 5, two porous electrocatalyst layers each were well bonded to the either side of the pore-free membrane, uniformly and continuously and there was observed no delamination phenomenon.

Because the same stainless steel frame was used for the formation of the pre-formed sheet and the MEA, they both were 180 μm thick. That is, the thickness of the precursor sheet of the MEA was less by 40 μm than that of the pre-formed sheet. Therefore, the Pt/C electrode layers ere embedded into the membrane to the extent as much as the difference.

FIG. 6 shows the surface of the electrocatalyst layers formed according to the present invention, via an SEM photograph. This demonstrates that, in the electrocatalyst layers, porous Pt/C agglomerates are uniformly distributed with close contact with each other, as in the conventional ionomer-brushed or ionomer-impregnated electrodes fabricated using Nafion solution.

EXAMPLE II : PERFORMANCE OF SINGLE CELL

The characteristic of the MEA was evaluated by a performance test of a single cell.

After inserting the MEA fabricated in Example I between two Teflon-coated fiberglass gaskets, a separate teflonized carbon cloth was placed on each side of the MEA. The teflonized carbon cloth played a role in supporting the MEA as well as providing a hydrophobic distribution network for the proper diffusion of reaction gases to the MEA. This assembly was inserted into between two carbon plates in which gas inlets, gas outlets, and rib-channels for gas flow were provided. A single cell was obtained by compressing the carbon plate assembly between two copper end-plates. The single cell had an active electrode area of 25 $cm^2$. A fuel cell test station which comprised several temperature controllers, flow meters and an external humidifier was used to evaluate the performance of the single cell with a permission of an electronic load up to a maximum capability of 1 Kw.

Figure 7:
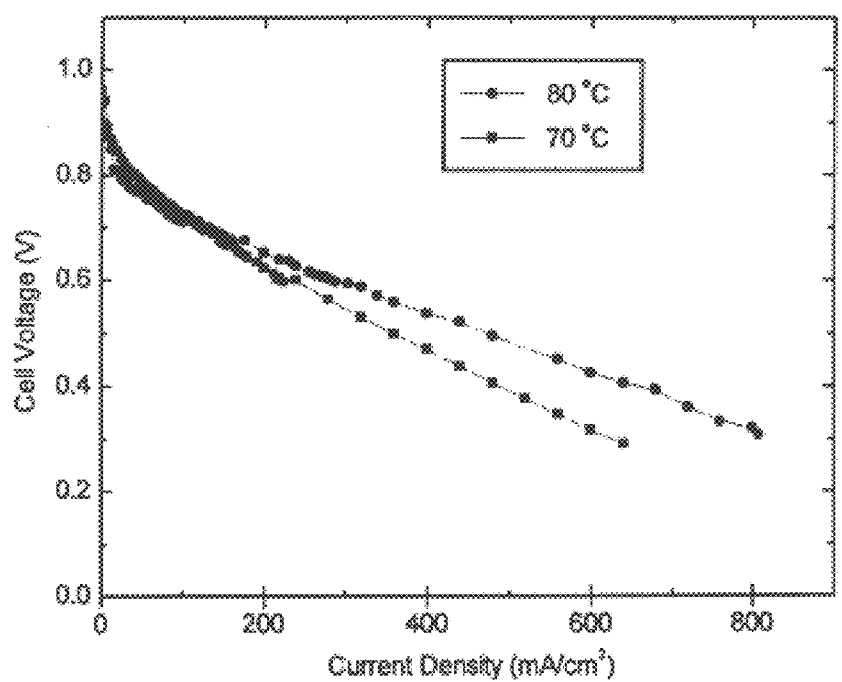
FIG. 7 shows current density vs. cell voltage curves of a single cell manufactured with the MEA of the present invention.

The test result is given in FIG. 7 in which cell voltages are plotted with regard to current density according to temperatures. As shown, the single cell was 0.6 V, 240 ma/$cm^2$ at 70° C. and 0.6 V, 285 ma/$cm^2$ at 80° C. As the temperature increased from 70° C. to 80° C., the performance of the single cell was somewhat improved.

As described hereinbefore, because the catalyst ink consists simply of Pt/C, glycerol and water without Nafion, the fabricating method in accordance with the present invention is economically much more favorable than the conventional methods using Nafion solution. In addition, the method of the present invention has a significant advantage of being simpler than conventional ones. Further, since the electrocatalyst layers are embedded into the precursor sheet by virtue of the fact that the precursor sheet is partially melted upon hot pressing, the MEA fabricated by the method of the present invention is far superior to conventional MEAs in the bonding strength between electrode and membrane and in the effective electrode reaction on the three-phase boundary.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A method for fabricating a membrane and electrode assembly for polymer electrolyte membrane fuel cells, comprising the steps of:

pre-forming a perfluorosulfonyl fluoride copolymer powder having a particle size distribution of 20–200 μm into a sheet by a hot pressing process at a temperature of 200–250° C.;

coating an electrocatalyst ink on either side of the pre-formed sheet by a screen printing process and drying the coats, said ink consisting essentially of carbon supported platinum, glycerol and water in the absence of perfluorinated sulfonyl fluoride binder;

embedding the electrocatalyst coats into the sheet by hot pressing the electrocatalyst-coated sheet; and hydrolyzing the electrocatalyst-embedded sheet to convert the membrane of the sheet from a non-ionized form into a ionized form.

2. A method as set forth in claim 1, wherein said electrocatalyst ink ranges, in weight ratio for carbon-supported platinum:glycerol:water, from 1:3:5 to 1:10:5.

3. A method as set forth in claim 1, wherein said pre-forming step and said embedding step are carried out in one stainless steel frame of a predetermined dimension.

4. A method as set forth in claim 1, wherein said hydrolyzing step is carried out in a mixtuer of 20% NaOH/methanol solution to convert the perfluorosulfonyl fluoride membrane of said pre-formed sheet into an $Na^+$ form of perfluorosulfonate membrane.

5. A method as set forth in claim 4, wherein $Na^+$ form of perfluorosulfonate membrane is further converted an $H^+$ m by additional hydrolysis with a 0.5 M $H_2SO_4$ solution.

6. The method of claim 1 wherein the electrocatalyst is embedded into the sheet by hot pressing the electrocatalyst-coated sheet at a temperature wherein said sheet is partially melted.

7. The method as set forth in claim 2 wherein said pre-forming step and said embedding step are carried out in one stainless steel frame of a predetermined dimension; said hydrolyzing step is carried out in a mixture of 20% NaOH/methanol solution to convert the perfluorosulfonyl fluoride membrane of said pre-formed sheet into an $Na^+$ form of perfluorosulfonate membrane and said $Na^+$ form of the perfluorosulfonate membrane is further converted to a $H^+$ form by additional hydrolysis with a 0.5 M $H_2SO_4$ solution.

* * * * *